Oct. 18, 1927.  
J. T. WILKIN  
GEAR  
Filed Aug. 4, 1927  
1,646,374  
2 Sheets-Sheet 1

INVENTOR  
John T. Wilkin,  
BY  
Hood + Hahn.  
ATTORNEYS

Patented Oct. 18, 1927.

1,646,374

UNITED STATES PATENT OFFICE.

JOHN T. WILKIN, OF CONNERSVILLE, INDIANA.

GEAR.

Application filed August 4, 1927. Serial No. 210,469.

The object of my invention is to produce metallic gears having teeth integral with the body of the gears, of the external or internal spur type or of the bevel type, of such character that, when two of such gears are placed in co-operative relationship, power may be delivered to one through the medium of the other at higher speeds, with less noise and with greater uniformity of angular velocity and under better conditions of lubrication than has heretofore been considered possible.

Heretofore, in general practice, toothed gears most commonly in use have been those in which the teeth are of a type capable of meshing with teeth of a similar type and for commercial reasons this is an essential characteristic of commercially practical gears. The teeth of such gears are of two types, cycloidal and involute. The contacting portion of such tooth outside of the pitch circle is the addendum; the contacting portion of the tooth immediately inside the pitch circle is the dedendum; and that portion still farther within the pitch circle and not actually contacted by a meshing tooth, which provides the "clearance" is the root.

Such teeth, and only such teeth, are capable of coordinating with similarly formed teeth of another gear, and in commercial practice these teeth have contacting surfaces which are involute or cycloidal curves. In the claims, I shall refer to such teeth as teeth having contacting surfaces which are odontic curves.

In order that my meaning of the phrase "odontic curves" will be clearly understood I call attention to the fact that a single gear may be designed by an arbitrary adoption of almost any desired form of contacting surfaces and that a mating gear can be produced by using the first gear as a matrix by which to generate the mating gear teeth, but the teeth of such mating gear would not be similar to the teeth of the matrix gear.

The mating teeth of such two gears would not have odontic curves within the meaning of that phrase as I have used it herein, and therefore would not be similar teeth within the meaning of that phrase as used herein.

The general practice in the commercial design of such involute and cycloidal teeth has been to design the teeth so they will have great rigidity. As a consequence it has become the practice to so design and proportion the teeth that during the major portion of the time the entire transmission of power is through the medium of a single pair of teeth, a second pair coming into action only slightly before the first pair passes out of action. In the commercial production of such rigid teeth certain standards have heretofore been adopted as to the practical radial extent of the addenda and the consequent necessary radial extent of the dedenda and root. In the establishment of such standards the radial extent of the addendum has been limited, because it was found that too great an addendum with rigid teeth produced too much sliding under high pressure, thereby resulting in production of undesirable heat and difficulties of lubrication.

Some attempts have been made to produce gears of the rigid type in which two or more pairs of teeth would at all times be in contact but it was found that the required accuracy of contour and spacing of metal teeth for multiple contact at high speeds was not attainable by commercial methods, and the tendency within recent years has been toward the more rigid single contact tooth construction, this tendency including a shortening of the teeth. Good examples of this tendency are to be found in what are commonly known as the Fellows stub tooth, and the Maag tooth.

Gears so formed are very rigid and require the very highest attainable degree of accuracy of production, because it has been found by experience that very small variations from theoretical accuracy either of contour or spacing, result in the transmission of impulses which cause breaking of contact during operation, thereby producing noise and destructive hammering and pitting of the faces of the teeth. The intensity of such impulses increases as the square of the increase of the speed.

According to my invention the working faces of the teeth are formed with odontic curves. That is, the teeth of mating gears should be both involute curves or both cycloidal curves. The thickness of the teeth at the pitch line is substantially decreased below present recognized standards of strength for a desired load because, in my gears, a larger number of teeth, will be bearing the load. The addenda are also radially lengthened substantially beyond present accepted standards in order that there shall be three or more pairs of teeth at all times in action.

The addenda, at their tips, are relieved slightly from theoretical accuracy in order that there shall be no sharp edge which would cut into the oil film on the approaching tooth, as will be hereafter pointed out more fully.

The dedenda are inwardly extended to correspond and allow proper action with the extended addenda of the mating teeth. Such a tooth, having the characteristics heretofore stated, is supported by a root having a radial dimension very substantially greater than a root which provides merely for clearance. This extended root is so formed as to be a part of a cantilever beam of substantially uniform strength which, if its outlines were extended into the dedendum of the tooth, will fall entirely within the contacting portion of the tooth.

For convenience I shall designate as the "tooth" the contacting portion, i. e., the addendum and dedendum, and I shall call that portion which extends below the dedendum (and such clearance as may be provided) to the base, as the "sub-root."

It will, of course, be understood, that, at the junction of the sub-root and integral body there will be a rounded fillet of usual form to avoid, in the usual manner, probability of rupture.

In practice I have found that the addendum of the tooth may be actually extended to the limit of possibility, which is the point where the addendum curves intersect, excepting only that the tip of the power-receiving tooth should not be a sharp corner but should be rounded or relieved slightly. In other words the power-receiving face at the end of the driven tooth should, when contacting with its driving tooth, be incapable of cutting the film of oil which lies upon the driving tooth but should be so formed that, just as the teeth come in contact, the approaching surfaces will be substantially parallel surfaces, of as much area as possible, between which a film of oil will be entrapped, instead of being ruptured and scraped away.

It will be understood that the pitch and precise contours of the teeth and sub-roots will be determined by the load which is to be transmitted, the number of pairs of teeth at all times carrying that load and the conditions under which the work is to be performed and that the precise pitch and contour cannot be stated specifically in advance but there are certain fundamental rules which must be followed.

First. It is a requirement that the working portions of the teeth shall be of such character that the same geometric rule which is used to determine the shape and pitch of the teeth of the driving wheel shall be used in determining the shape and pitch of the teeth of the driven wheel. That is to say, if the wheels are of the same pitch diameter the teeth of both gears will be identical (except that only the working side of the ends of the driven teeth need to be relieved for lubrication), whereas, if the gears are of different pitch diameters, the teeth will differ in shape but their shapes and pitch will be determined by the same geometric rule. This is merely another way of saying that the contacting faces of the teeth shall be similar odontic curves.

Second. Each tooth must be provided with a sub-root of sufficient radial extent to make it capable of a circumferential yield, under load, equal to the unavoided departure from theoretical accuracy as to contour and/or spacing. That is to say, in any position of the gear teeth, there will, or may be, at each line of contact between each pair of teeth in contact at the moment an unavoided departure from theoretical accuracy in either or both of the teeth. Each pair of coacting teeth, if their combined error makes them more prominent than they should be, must, therefore, be capable between them of yielding to such an extent that their actual departure from theoretical accuracy at the point of contact shall be compensated by that yield, and furthermore, the excess pressure required to produce that yield must not be sufficient to completely unload or break contact between the adjacent contacting teeth.

Third. The circumferential yield of each tooth must be distributed as uniformly as possible throughout the length of the tooth and its sub-root, in order that there may be no local concentration of fiber stress resulting in an ultimate rupture of the tooth. That is to say, the sub-root must be a part of a beam of uniform strength and must merge without offset, into the dedendum of the tooth.

Fourth. The addenda of the teeth should be substantially longer than has heretofore been considered within the range of good practice with rigid teeth, thus insuring that there shall at all times be three or more pairs of teeth in working contact.

It should be understood that in designing gears embodying my invention the designer, after having determined the pitch and number of pairs of teeth (in excess of two) which are to be in action at all times, must determine the length of the sub-roots. In this determination of length of sub-roots the designer should bear in mind the fact that the deflection of a cantilever beam at the point of application of a load varies as the cube of the distance between the fixed point and such point of application and that consequently deflection resistance of a tooth to the applied load will vary as the cube of the distance between the base of the sub-root and the point of application of the load. The designer must therefore bear in mind the fact that the length of the sub-roots should be such that at the moment when any driven tooth comes into action at its top it shall be incapable of bearing a pressure high enough, to impart or cause a shock or change of angular velocity of the driven wheel but, on the contrary shall yield to such an extent that the application of load will be gradual.

At this point it will be well to bear in mind the advantage which is gained by relieving the tips of the addenda of the receiving faces of the teeth of the driven gear because it is in this position that each receiving tooth will offer the least pressure resistance and at this point the lubricating film should be maintained and then pushed ahead by the travel of the line of contact.

The accompanying drawings illustrate my invention.

Figures 2 and 3 show in dotted lines the extension of the parabolas to their vertex M. CABD outlines the sub-root.

When most of the conditions governing a gear drive are known, the gears can be designed in accordance with my invention by using the general formula for the deflection of the loaded end of a cantilver beam of constant width and variable depth as follows:

$$Y = \frac{GPL^3}{Ebd^3} \quad \text{Equation I.}$$

Where,
G = A coefficient depending on the shape of the beam.
Y = Deflection.
P = Load.
L = Length of beam.
E = Modulus of elasticity.
b = Width of beam = face of gear.
d = Depth of beam at base = thickness of tooth at base of sub-root.

Figure 1:
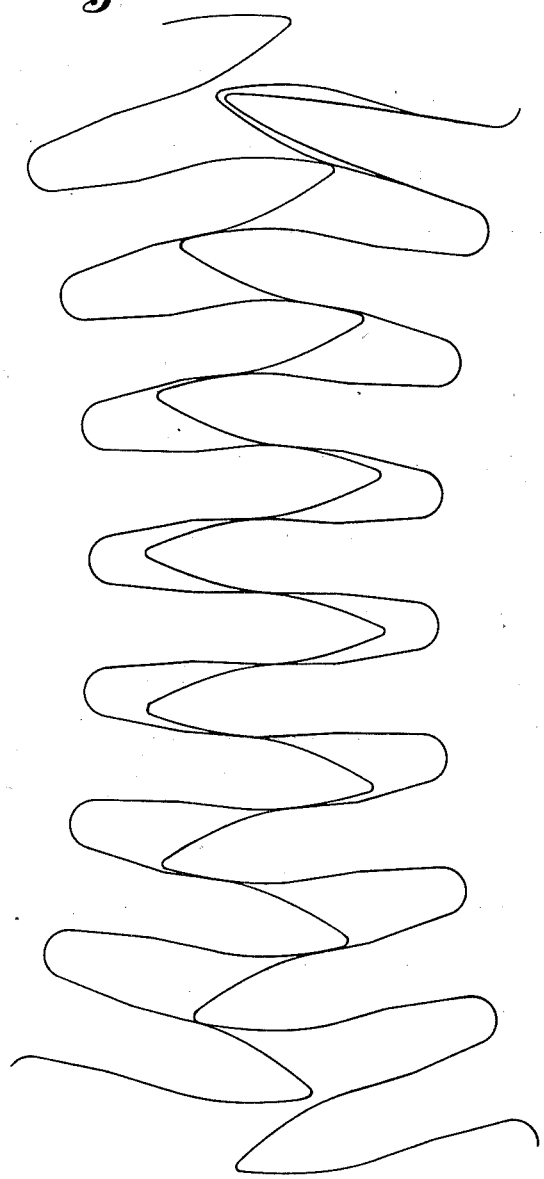
Figure 1 is a fragmentary elevation of a pair of meshing gears embodying my invention, and showing five pairs of teeth in contact when under load.
Figure 2:
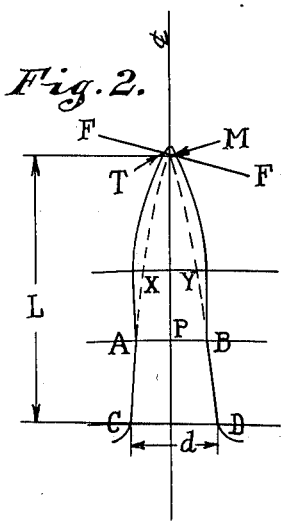
Figure 2 shows a single tooth, the odontic faces of which are cycloidal curves.
Figure 3:
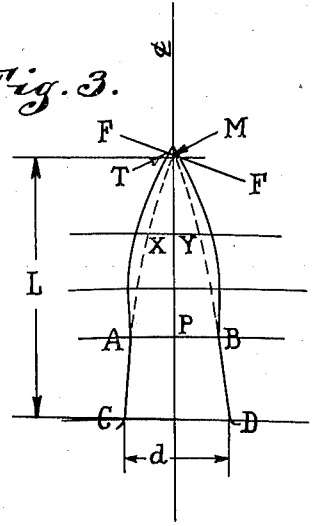
Figure 3 shows a single tooth, the odontic faces of which are involute curves.
Figure 4:
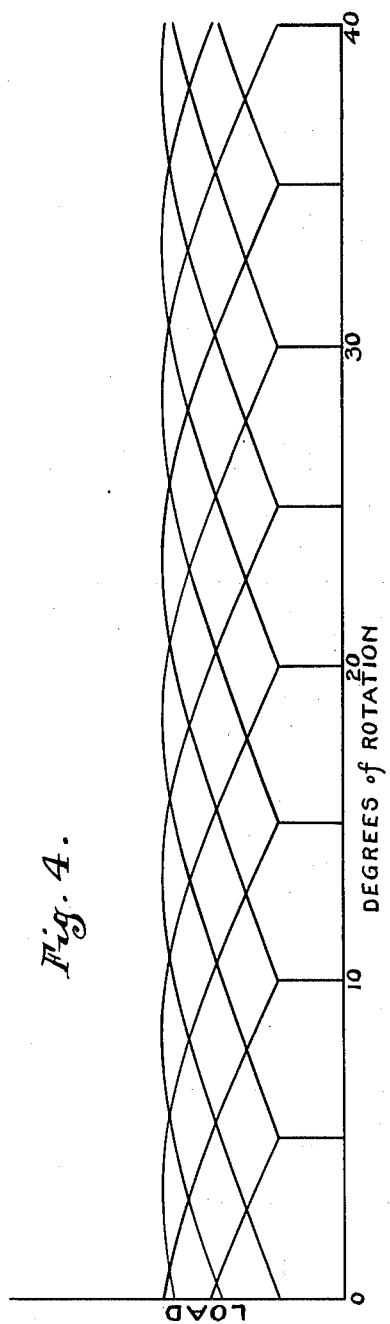
Figure 4 shows in diagrammatic form the calculated pressure variation per inch face on each tooth in its different positions while in action, with an assumed total load and five pairs of teeth in action, as shown by Figure 1.

Referring to Figures 2 and 3, at the point of initial tooth contact at T the tooth pressure is exerted along the line of action F—F, cutting the center line at M.

If a parabolic curve is now generated with the point M as its vertex and the distance AB as a double ordinate, it will represent a cantilever beam of uniform strength having the load concentrated at M. The points A and B, which govern the extent of the dedendum, must be of sufficient distance from the pitch line to permit proper tooth action without interference. If the parabolic curves are continued to C and D, the parabola of uniform strength will be defined by MXAC and MYBD with the pressure acting at the vertex M. This pressure will be that component of the load which is normal to the center line of the tooth. All of the tooth outside of the parabolic curves will be excess material. However, since all of the tooth below AB is a portion of the parabolic beam of uniform strength, the portion CABD will be a portion of uniform strength. In other words, the fibre stresses due to bending will be equal in all sections throughout CABD. At the junction of the sub-root and gear body each tooth is further strengthened by rounded fillets on both sides which prevents a tendency to rupture at this point.

It should be noted that as a parabolic curve becomes more remote from its vertex it approaches a straight line so that for all practical purposes the sides of the tooth along AC and BD may be made straight. Now if we know the load which a tooth is to carry, and the modulus of elasticity for the material of the tooth, we can solve for $\frac{L^3}{d^3}$ in Equation I for any desired deflection.

Referring again to diagrams 2 and 3, we can calculate the distance from M to the pitch line and by adding the distance from the pitch line to AB, which has been taken as the minimum or nearly minimum distance which will allow proper tooth action, we know the abscissa MP of the parabola CAXM Y B D. The ordinate PB of this abscissa may be determined and we then have given one abscissa and its ordinate of the uniform strength parabola. According to the formula for a parabola the abscissæ are to each other as the squares of their ordinates and we have the formula.

$$\frac{MP}{L} = \frac{(PB)^2}{(d/2)^2} \quad \text{Equation II.}$$

Since MP and PB are known we can again solve for $\frac{L}{(d/2)^2}$.

By combining Equations I and II we can find the values of L and d for any desired deflection and thus construct our tooth.

It will be observed that the mass of metal near the top of my tooth is very small, therefore, any shock due to mass resistance at the time of initial contact must be small.

Furthermore, since the deflection of a cantilever beam under a given load increases with the cube of the distance from the base to the point at which the load is applied, it is evident that with the smaller mass, and the decreased pressure required to deflect the point of the teeth of my gears, the initial contact of the teeth will occur without noise, and without shock to the bodies of the gears.

Furthermore, with the multiple number of teeth in contact and the resultant decreased intensity of pressure on the several teeth in contact, and the absence of shock and hammering, better lubrication is accomplished and this also tends to prevent noise.

This application is a continuation in part of my application Serial No. 101,904, filed April 14, 1926.

I claim as my invention:

1. Metal gears having integral teeth wherein the contacting portions of the teeth are odontic curves and wherein each tooth is subtended by a sub-root the faces of which merge without offset with the tooth and are approximately portions of equal stress parabolas which, if extended to their vertex, would lie wholly within the tooth, said sup-roots being of sufficient length to make the teeth capable of circumferential yield under applied load of approximately the unavoided departure of the contacting surfaces of mating pairs of said teeth from theoretical accuracy.

2. A metal gear having integral teeth with odontic curves, wherein each tooth is subtended by a sub-root the faces of which are approximately portions of equal stress parabolas which, if extended to their vertex, would lie wholly within the contacting portions of the tooth.

3. Metal gears of the character specified in claim 1 wherein the addenda are extended substantially to the intersection of the odontic curves.

4. A metal gear having integral teeth with odontic curves wherein each tooth is subtended by a sub-root, the faces of which are approximately portions of equal stress parabolas, and wherein the addenda are extended substantially to the intersection of the odontic curves, and the junctions between the odontic curves and the tooth tops are relieved to avoid deleterious scraping of lubricant from the approaching mating tooth.

5. A metal gear having integral teeth with odontic curves wherein each tooth is subtended by a sub-root which is approximately a portion of a cantilever beam of uniform strength when loaded at its vertex, said sub-roots being of sufficient length to make the teeth capable of circumferential yield under applied load of approximately the unavoided departure of the contacting surfaces of said teeth from theoretical accuracy and wherein the faces of said sub-root intersect the dedendum faces of the tooth approximately at the tooth root.

6. Metal gears each having integral teeth with odontic curves and with extended addenda wherein three or more pairs of teeth will be under load at all times when in contact with the teeth of the opposed coordinated gear, and wherein each tooth is subtended by a sub-root which, when considered in connection with the tooth dimensions, is approximately a portion of a cantilever beam of equal strength, the length of said subroot being sufficient to permit a combined yield of each contacting pair of teeth under load, of an amount which will compensate the combined errors of said mating teeth without completely unloading the other pairs of mating teeth in action.

7. A metal gear having integral teeth with odontic curves and with extended addenda wherein three or more pairs of teeth will be under load at all times when in contact with the teeth of a like opposed coordinated gear, and wherein each tooth is subtended by a sub-root which, when considered in connection with the tooth dimensions, is approximately a portion of a cantilever beam of equal strength, the length of said sub-root being sufficient to permit a combined yield of each contacting pair of teeth under load of such character that the load will be distributed among the several pairs of coacting teeth in accordance with the radial location of their tooth contacts and the unavoided errors of each pair of teeth.

8. Gears of the character specified in claim 7 wherein the length of each sub-root is sufficient to insure minimum bearing pressure on that portion of the teeth where there is maximum sliding action and maximum bearing pressure on that portion of the teeth where there is minimum sliding action and whereby concentration of pressure load near the pitch lines, will increase as the load increases.

In witness whereof, I, JOHN T. WILKIN, have hereunto set my hand at Connersville, Indiana, this fourteenth day of July, A. D. one thousand nine hundred and twenty-seven.

JOHN T. WILKIN.